United States Patent [19]

Segal

[11] B 3,919,386

[45] Nov. 11, 1975

[54] METHOD OF RAPIDLY FORMING HOLLOW OBJECTS FROM REINFORCED PLASTIC SHEETING

[75] Inventor: Leon Segal, Morristown, N.J.

[73] Assignee: Allied Chemical Corporation, New York, N.Y.

[22] Filed: Mar. 1, 1973

[21] Appl. No.: 337,235

[44] Published under the Trial Voluntary Protest Program on January 28, 1975 as document no. B 337,235.

[52] U.S. Cl. ............... 264/255; 264/167; 264/294
[51] Int. Cl.² ................................... B29C 27/12
[58] Field of Search ........ 264/325, 294, 167, 248, 264/255, 256, 263

[56] References Cited
UNITED STATES PATENTS

| | | | |
|---|---|---|---|
| 329,273 | 10/1885 | Chickering | 264/325 |
| 1,352,161 | 9/1920 | Willard | 264/325 |
| 2,033,643 | 10/1936 | Neill | 264/325 X |
| 2,892,217 | 6/1959 | Luboshez | 264/294 |
| 3,626,053 | 12/1971 | Hofer | 264/294 X |
| 3,655,863 | 4/1972 | Andersen | 264/325 X |

Primary Examiner—Richard R. Kucia
Attorney, Agent, or Firm—Robert H. Criss; Patrick L. Henry

[57] ABSTRACT

A method for forming hollow or tubular objects from thermoplastic or thermosetting polymer compositions employing a stamping or rapid forming operation. The plastic objects may optionally be reinforced and/or particulate filled and are formed by stamping around an internal shape using matched external mating mold sections.

14 Claims, 9 Drawing Figures

FIG. 1
FIG. 1a
FIG. 2
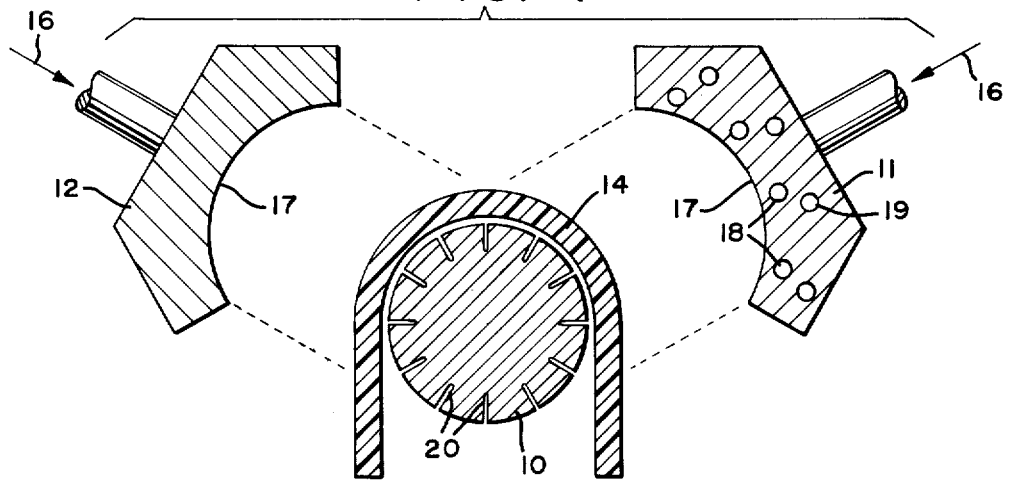
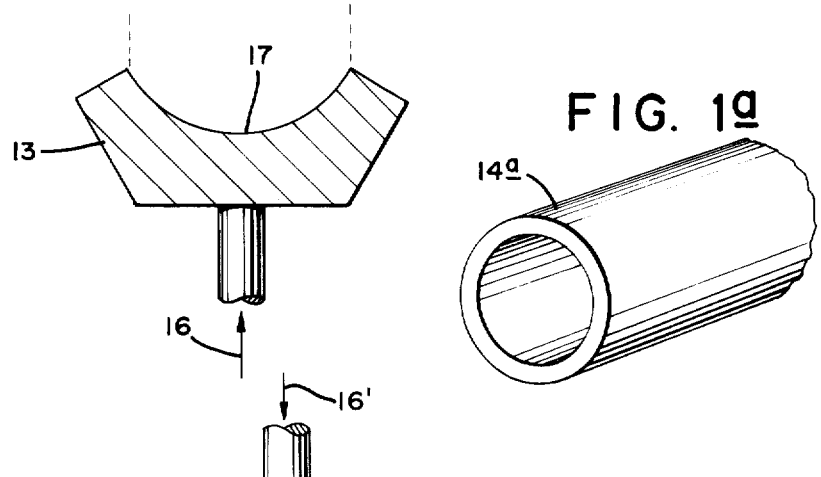
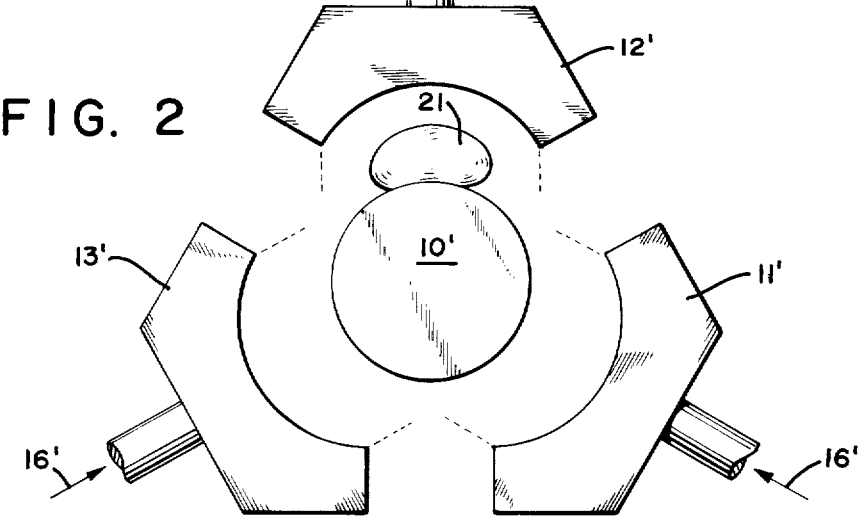

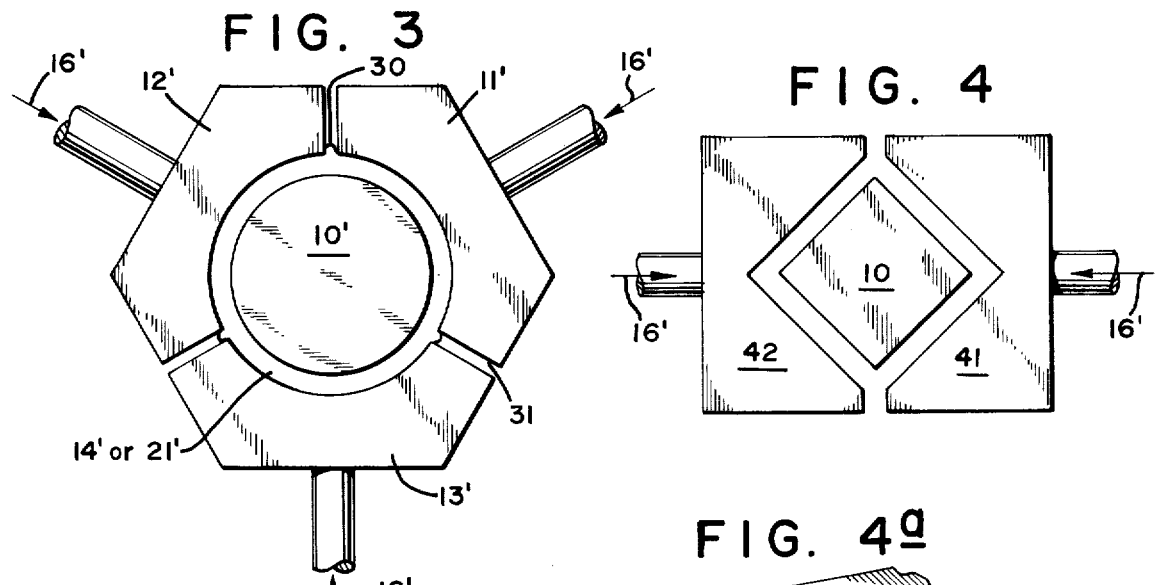
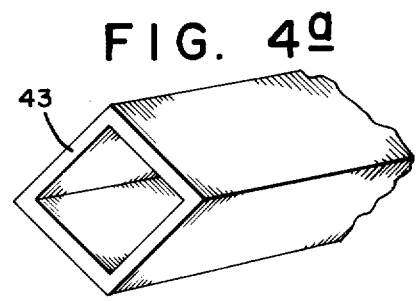
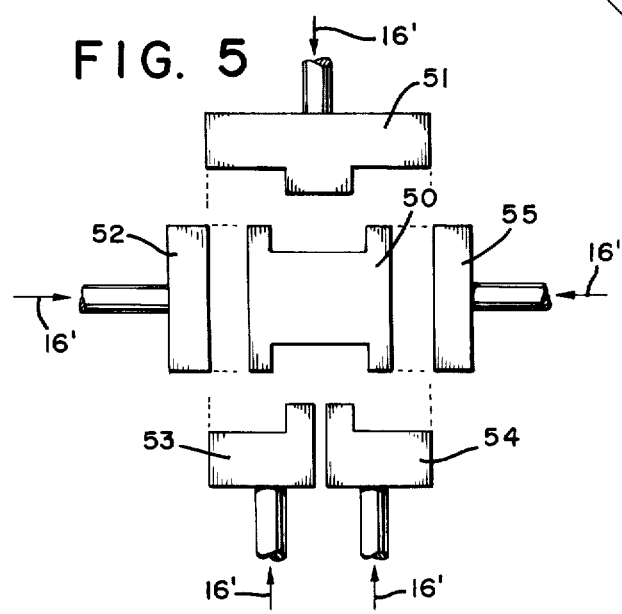
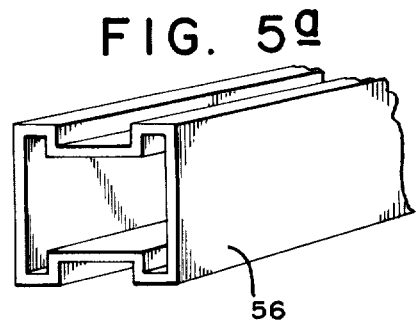
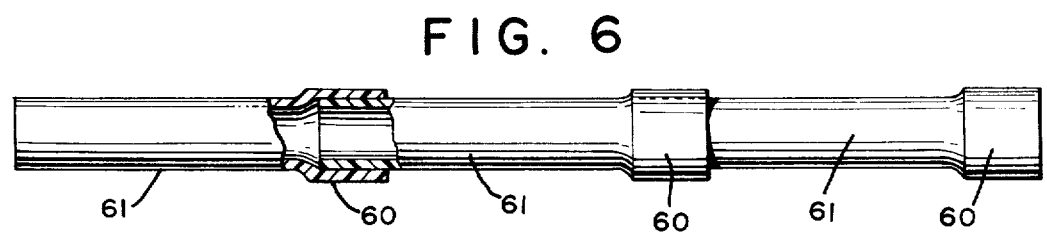

METHOD OF RAPIDLY FORMING HOLLOW OBJECTS FROM REINFORCED PLASTIC SHEETING

BACKGROUND OF THE INVENTION

This invention relates to a method for rapidly forming pipe or other hollow, tubular objects from thermpolastic or thermosetting polymer compositions. More particularly, this invention relates to a method for forming such plastic hollow objects by stamping around a mandrel or internal shape using matched external mating mold sections.

For purposes of this disclosure the term "hollow tubular objects" is meant to include any closed-wall object which is open on two opposite ends. This would thus include objects with cross sections circular, square, oval, I-beam or otherwise assymetrical in shape.

Tubular pipe has in the past been fabricated by many methods. Metallic piping materials can be made by casting (as in cast iron or high-silicone cast irons); welding, drawing, forging, and extrusion (applied chiefly to aluminum, copper, lead, and tin). If the application does not preclude a seam, welding methods can be used. The welding processes include butt and lap welding by dies and rolls, electric-resistance butt welding, hammer welding and fusion welding. The seamless processes include forging (i.e. from a solid billet) and drawing through dies.

Plastic possesses many advantages over metallic pipe. It does not rust, scale, pit or rot; it is generally non-toxic and the smooth surface qualities provide maximum flow rates. In addition, plastic pipe is light weight and easy to install as well as being non-conductive and often self-insulating.

Non-metallic (plastic or rubber) pipe is usually made by extrusion or filament winding, as these are the fastest methods currently available. In addition, centrifugal casting and hand lay-up are also used to produce plastic pipe. Blow molding is also used to fabricate hollow containers, bottles, receptacles, etc.

In plastic pipe extrusion, a screw normally forces heated plastic through a die or orifice which has the approximate shape of the desired profile. The extruded plastic is normally conveyed through a water bath to speed cooling and setting up of the pipe. In order to preserve the shape of the extruded plastic, the extruded form must be cooled and supported by a suitable take-off mechanism. The rate of production of extruded pipe is dependent upon extruder capacity, pipe diameter and pipe wall thickness. For example, a 3½ inch diameter extruder (screw diameter = 3½ inch) may have a maximum throughput of 100 lb/hr of pipe, while a 4½ inch diameter extruder may have a 200 lb/hr maximum throughput. For the 3½ inch extruder, this corresponds to a lineal output rate of 4 ft/min for 2 inch diameter schedule 40 pipe, and approximately 8 ft/min for 1 inch diameter pipe. In the case of the 4½ inch extruder, the corresponding output would be approximately 7 ft/min for 2 inch pipe and 10 ft/min for the 1 inch pipe. The output of 6 inch pipe would be 1½ inch ft/min on 4½ inch extruder. For larger pipe diameter, the lineal output rate would be correspondingly smaller. It is evident that extrusion is a fairly slow method of pipe manufacture even when large extruders are employed.

Filament winding is a fabrication technique for forming reinforced plastic hollow parts in which continuous fibers or filaments encased in a matrix of resinous material (usually a thermosettable polymeric material) are wound into a definite pattern. The reinforcement is usually glass fibers in one of several forms. The reinforcement-matrix combination is wound continuously on a form or mandrel whose shape corresponds to the inner structure of the part being fabricated. After curing of the matrix, the pipe duct, or hollow structure is removed from the mandrel. Curing of the thermosetting matrix is normally conducted at elevated temperatures without pressure. With highly automated equipment, a 2 inch diameter, 20 ft. length of filament wound pipe can be produced in 3 minutes. A 6 inch diameter pipe 20 feet long can be produced in 7 minutes. Thus, filament winding is also a slow process. Additionally, the strength of the products is unevenly distributed as a result of the winding process.

It is therefore obvious that despite the advantages intrinsic to plastic pipe, the rather slow and costly methods currently employed in their preparation limit their usage. Moreover, when plastic pipes having complicated interior shapes are desired, it is necessary to form the pipes in a number of sections and to join them in a separate operation. This is disadvantageous because in addition to the longer time involved, the pipe is weakened in the area of the joining. There is, thus, clearly a need for a method to rapidly and economically produce seamless hollow plastic objects or pipes.

SUMMARY OF THE INVENTION

In accordance with the procedure of this invention, hollow, tubular plastic articles are formed by employing a relatively moveable internal mandrel of shape corresponding to the inner structure of the article to be fabricated and matched, external, pressure applying mating sections to shape a formable plastic charge of volume sufficient to yield an article of the desired shape. Using these procedures it is possible to produce a thermoplastic pipe or similar hollow object possessing a uniform distribution of strength at an approximate rate of one section every 10–60 seconds or a similar thermoset object in approximately 0.5–5 minutes. Thus, for thermoplastics, a 20 ft. length of 6 inch diameter pipe can be produced in approximately 30 seconds, corresponding to a lineal rate or 20 ft/min. This rate of production is approximately 10 times as great as can be conveniently produced by extrusion or filament winding. Furthermore, according to the method of this invention, irregularly shaped objects can also be formed as rapidly as described above. Thus, for example, hollow squares, ovals, I-beam or assymmetrical and similar irregular cross-sections can be produced rapidly. The time required to prepare an object in accordance with this invention would be dependent only on the material, the thickness of the desired object and the temperature or curing conditions employed and would be irrespective of pipe diameter or shape. In addition, a continuous mode of operation can be readily adapted.

This invention has an object to provide a means of rapidly forming plastic pipe or similar hollow objects.

It is another object of this invention to provide a means of rapidly forming reinforced plastic pipe or similar hollow objects.

It is a further object of this invention to provide a means of rapidly forming hollow objects having irregular or assymmetrical cross-sections.

Additionally, it is an object of this invention to provide a means of rapidly forming continuous lengths of pipe or similar hollow objects by continuous or semi-continuous modes of operation.

These and other objects and advantages will be made clear in the description of this invention.

BRIEF DESCRIPTION OF THE DRAWING

FIG. 1 illustrates the production of a length of circular pipe from a sheet.

FIG. 1A illustrates an article shaped by the apparatus of FIG. 1.

FIG. 2 represents the production of circular pipe from a bulk charge.

FIG. 3 shows the apparatus of FIG. 1 and/or 2 during the compression of closed stage.

FIG. 4 illustrates the forming of a square cross-section pipe or conduit.

FIG. 4A illustrates the formed pipe.

FIG. 5 shows the formation of a hollow I-beam.

FIG. 5A represents the I-beam thus formed.

FIG. 6 is a method of manufacturing a continuous length of polymeric pipe.

DESCRIPTION OF THE PREFERRED EMBODIMENTS

The method of the present invention is described in the accompanying diagrams.

In FIG. 1, the production of a length of circular pipe is illustrated. A front view of the forming apparatus is shown. The mandrel, No. 10, is centered between the moving and mating external mold sections Nos. 11, 12 and 13. For the purpose of illustration, three external mold sections are shown in FIG. 2, however, it is obvious that two, three or four or more sections can be used.

In FIG. 1, the polymeric charge is shown being introduced in the form of a heated sheet. The sheet upon heating is pliable and drapes over the mandrel in a near-molten condition in the case of thermoplastics, or in an un-cured or partially cured condition in the case of thermoplastics, or in an un-cured or partially cured condition in the case of thermosets, and thus can be readily formed into the desired configuration. The width of the sheet should be slightly greater than the circumference of the mandrel if the thickness of the sheet is to be equal to the thickness of the finished product 14. If the wall thickness of the desired product is smaller than that of the initial sheet, then the sheet width may be smaller than that of the circumference of the mandrel. The volumetric amount of material input must be sufficient to assure a perfectly complete final object without any apparent seamline.

The moving mold sections 11, 12 and 13 are then bought towards the central mandrel, by a force 16 and exert a forming pressure upon the polymeric charge or blank with the interior surfaces of the mold 17 shaping the sheet around the external surface of the mandrel.

The mold sections may be brought together simultaneously, or in a step-like synchronous motion, i.e. Sections 11 and 12 first (together or one at a time) followed by Section 13, which gathers the two loose ends during the upperend stroke and seams them together during the forming operation. An essentially seamless strong joint is obtainable. The closing time of the external sections is usually from about ½ to 5 seconds with the total time cycle 10 seconds to 5 minutes as discussed above.

The polymeric sheet is thus formed into the desired configuration 15 as shown in FIG. 1A, under the appropriate pressure. Pressures of from 50 to 2000 psi are suitable, depending upon such factors as the polymeric composition, pre-heat temperature, filler or reinforcement content, surface smoothness desired, etc. Heating channels 18 and/or cooling channels 19 may be provided in the moving external sections and in the core or mandrel to provide for curing, crystallization, cooling, or setting up of the thermosetting or thermoplastic polymeric materials. In addition, vacuum holes may be provided in the central mandrel section to aid forming of the charge around its perimeter. The total cycle time for this process is dependent upon the composition of the charge, the wall thickness of the final process, the temperatures of the charge and the pipe-forming sections (internal mandrel or core and external mating sections), the forming pressure, and other process parameters.

The external mating mold sections may be activated to exert the desired pressure by any one of many means. Hydraulic or pneumatic rams, inflatable mold sections, mechanically activated cams or toggle clamps, or similar means may be used to move the mold sections and/or exert and hold the desired pressure upon the plastic material during the pipe stamping operation.

After the suitable cooling or curing time has elapsed, the external sections 11, 12 and 13 are withdrawn from the core, and the pipe or similar section is removed. Removal may be facilitable through the use of air pressure from vent holes 20, knock-off rings, a tapered central mandrel, mechanically expanding mandresl, pneumatically hydraulically expanding mandrels, release agents or coatings on the mandrel or in the polymer, or combinations of these features, or similar devices. A release layer, of thermoplastic, paper, metal, or similar material, may also surround the mandrel. Such a layer may optionally become an intergral part of the interior of the finished objects.

FIG. 2 illustrates a forming scheme essentially identical to that of FIG. 1, with "primed" numbers representing the similar parts of FIG. 1, except that the charge 21 is in bulk form rather than in sheet form. The "bulk" form would include rope or log form, cakes, balls, billets, etc. The bulk charge would be preheated or molten in the case of thermoplastics, or un-cured or only partially cured in the case of thermosetting materials.

FIG. 3 shows the apparatus of FIG. 1 and/or 2 during the compression or closed stage. It is obvious that some flash, edges, trim, squeeze-out, or excess material 30 may be formed during compressions if the design of the molding dies is not exact, if too much material is present initially, or if the material has a too low viscosity. This flash may be left on the shaped object, trimmed off after shaping is complete, or trimmed off during shaping by the use of cutting or shear edges on the external mold sections 31.

FIG. 4 illustrates the forming of a square cross-section pipe or conduit. Again, it is obvious that two, three, four or more external mold sections (two, 41 and 42, being shown in FIG. 4) can be used to shape the plastic material around the central mandrel or core 40. The final product is illustrated schematically in FIG. 4A by 43.

FIG. 5 illustrates the forming of a hollow I-beam. In this illustration, five moveable external mating sections 51, 52, 53, 54 and 55 are used to pressurize the polymeric material surrounding the core 50. The shape of the finished conduit is shown in FIG. 5A.

One method of manufacturing a continuous length of polymeric pipe is illustrated in FIG. 6. Here the pipe section, which has one expanded end 60 and one unexpanded end 61 are joined as illustrated. The expanded end is easily obtained by utilizing a mandrel and outer mold set having the desired configuration. Flanges, beads, or similar attachment aids can also be integrally formed during stamping. The matching pipe sections can be inserted and joined together during stamping of adjacent pipe sections, yielding a continuous length of pipe or joined subsequently at the point of use. Joining methods utilizable include solvent welding, hot-gas welding, ultrasonic welding, spin welding, heat welding, butt-fusion, glueing, etc. Optionally, a continuous pipe could be formed by using a long sheet of polymer and stamping a section at a time while maintaining the newly formed section in contact with the unformed polymer sheets.

Suitable thermoplastic materials which may be employed comprise a wide range of polymeric compositions. Included, for example, are olefinic polymers such as polyethylene, polypropylene, and copolymers and terpolymers thereof, e.g. copolymers of ethylene and ethyl acrylate, vinyl polymers comprising one or more of the following monomers: vinyl aryls such as styrene, o-phenylstyrene, m-phenylstyrene, p-phenylstyrene, o-methylstyrene, m-methylstyrene, p-methylstyrene, o-methoxystyrene, m-methoxystyrene, p-methoxystyrene, o-nitrostyrene, m-nitrostyrene, p-nitrostyrene, and the like; vinyl and vinylidene halides, such as vinyl chloride, vinylidene chloride, vinylidene bromide and the like; vinylesters such as vinyl acetate, vinyl propionate, vinyl butyrate, vinyl chloroacetate, vinyl benzoate, and the like; polycarbonates; cellulosics such as cellulose acetate, cellulose triacetate, cellulose acetate butyrate, cellulose propionate, ethyl cellulose, and the like; polyamides such as nylon 66, nylon 6, nylon 610, poly-m-xylylene, adipamide, polyhexamethylene terephthalamide, and the like; polyesters such as polyethylene terephthalate, polyethylene isophathalate, poly(ethylene-2,7-naphthamate), polybutylene terephthalate, various copolymers thereof, and the like; chlorinated polyfluorocarbons such as polytetrafluoroethylene, polytrifluorochloroethylene, polyhexafluoropropylene and various copolymers and terpolymers thereof, as for example copolymers of vinylidene fluoride and trifluorochloroethylene, and the like.

Other thermoplastic polymers which can be utilized include polysulfone resins, polyacetal resin, halogenated olefins, and phenoxy resins. Also included in the term thermoplastic polymers are blends of two or more polymeric materials. Illustrative of such blends are polyethylene/polypropylene, ethylenacrylic acidvinyl acetate terpolymers, and the like. The term also includes the metallic salts of those polymers or blends thereof, which contain free carboxylic acid groups. Examples of such polymers include ethylene-acrylic acid polymers and ethylene-methacrylic acid polymer. Illustrative of the metals which may be used to provide the salts of such carboxylic acid polymers are the 1,2 and 3 valent metals such as sodium, calcium, and aluminum.

The particular parameters of the object forming operation are dependent upon the type of thermoplastic polymer used. Generally, the pressure would be in the range of about 50 to 2000 psi, the mandrel or external mating part temperature in the range of about −20 to 200°C. and the polymer pre-heat temperature from above the softening temperature to below the decomposition temperature of the individual plastic. The stamping time needed for thermoplastics will vary according to thickness, viscosity, etc. but will be in the order of about 4 to 60 seconds and will give an object with wall thickness of about 0.05 to 0.50 inch, with internal diameter from approximately one inch to any larger size desired.

If the thermoplastic composition is in sheet form, the sheet may be pre-heated to the softening point by any one of many heating methods, i.e. infrared heating, dielectric heating, induction heating, forced-air or vacuum heating, etc. or combinations of heating methods. The hot thermoplastic sheet is draped over the mandrel, and the external mating sections are closed to the desired pressure for the appropriate cooling or crystallization time.

If the thermoplastic composition is in bulk form, one advantageous way of combining the manufacture of the bulk charge with the pre-heat stage is to extrude a molten charge directly into the article shaping apparatus.

In addition to thermoplastic resins, any one or more of the known thermosettable resinous compositions may be utilized in the method of this invention. For example, polyesters, substituted polyesters, e.g. chlorinated polyesters, phenolics, polyurethanes, melamines, epoxies, ureas, silicones, and the like may be used. These resins can be modified, for example, by admixing therewith various ingredients e.g. thermoplastic polymers such as polyvinyl chloride, polyethylene, polystyrene, and the like. Also, they may be prepolymerized or prethickened by some means to the desired viscosity. Preferably, the compositions contain epoxy, polyester, or polyurethane resins.

Epoxy compounds included in the compositions of the present invention may be any of the known epoxy compounds which contain a plurality of epoxy groups of the structure

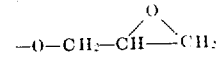

Typical examples of such epoxy compounds include polyglycidyl esters of polybasic acids as disclosed in U.S. Pat. No. 2,866,767; polyglycidyl ethers of polyhydric phenols as disclosed in U.S. Pat. Nos. 2,467,171; 2,506,486; 2,640,037 and 2,841,595 and polyglycidyl ethers of polyhydric alcohols as disclosed in U.S. Pat. Nos. 2,598,072 and 2,581,464.

Curable polyester resins contemplated for the thermosetting core of the invention may be any of the known compositions which contain a polymeric (a) and a monomeric component (b) i.e. one or more ethylenically unsaturated, polymerizable polyesters, polymers which contain, combined by ester linkages, radicals of one or more polybasic, particularly dibasic carboxylic acids and radicals of one or more polyhydric alcohols, particularly dihydric alcohols. Optionally, additional radicals of one or more of the following may be incorporated: monobasic carboxylic acids, one or more monohydric alcohols and one or more hydroxy carboxylic acids, at least some of said radicals having ethylenically unsaturated polymerizable groups and one or more monomeric, ethylenically unsaturated, polymerizable compound. Typical resin compositions of this kind are disclosed in U.S. Pat. Nos. 2,225,313 and 2,667,430, for example. Modified resins of this kind are also disclosed, for example, in U.S. Pat. Nos. 2,628,209, 3,219,604 and the like.

Curable polyurethane resins included in the compositions of the invention may be any known products obtained by the reaction of polyethers with diisocyanates. Typical examples of such resins are disclosed for example in U.S. Pat. Nos. 2,721,811; 2,620,516; 3,061,497 and 3,105,602.

In the case of these thermosetting resins, the parameters required for formation will also vary according to the particular composition. In general, the pressure required for forming will be in the range of about 50 to 2,000 psi, the mandrel or mating part temperature from about 20 to 200°C. and if desired, the polymer temperature may be elevated to hasten the cure. Stamping times will vary from about 0.5 to 15 minutes giving an object of wall thickness about 0.05 to 1.0 inch with any desired size diameter.

Thermosetting polymers may be partially cured during the stamping or shaping operation, followed by later post-curing operations upon the hollow object. Both the thermoplastic and thermosetting compositions may be modified by the use of reinforcing and/or filling or loading agents. The polymer of choice may be reinforced with fibrous reinforcement, as for example, glass fibers, metal fiber, carbon fibers, sapphire or alumina whiskers, jute, hemp, sisal or thermoplastic or thermosetting fibrous materials, such as nylon, rayon, polyester, and the like. The fibrous reinforcement may be in the form of yarn, chopped yarn, roving, scrim, woven cloth, woven roving, nonwoven mat, chopped or continuous fiber random mat, or the like. The fibrous reinforcement may comprise 0 to 45 percent by weight of the total thermoplastic or thermosetting fiber composite.

The polymer of choice may also be loaded with particulate filler. Such fillers may be selected from a wide variety of minerals, metals, metal oxides, siliceous materials, metal salts, and mixtures thereof. Examples of fillers included in these categories are alumina, aluminum hydrates, feldspar, asbestos, talc, calcium carbonates, clay, carbon black, quartz, novaculite, various polymorphs of silica, kaolinite, bentonite, garnet, sponite, calcium oxide, calcium hydroxide, etc.

In addition, the resinous composites may be reinforced with a mixture of fiber and filler. Such mixtures have many advantages including economic advantages. Also, the fiber or filler may be coated with sizing agents, coupling agents, adhesion promoters, wetting agents, and the like, as are known to those skilled in the art. Adjuvants such as thixotropic agents, lubricating agents, pigments, release agents, flame retardants, heat and light stabilizers, or similar processing aids may be added to the resinous composition. Laminates of two or more polymeric materials, or of polymer-metal foil composites may also be utilized in this invention.

Additionally, the method of this invention can be adapted utilize foamed thermoplastic material. A heat decomposable foaming agent such as azobisformamide, N,N-dimethyl-N,N-dinitroso terephthalamide, 4,4'-oxylis benzene sulfonye hydrozide trichlorofluoromethane, or the like, would be incorporated in the resin prior to forming around the mandrel. The heat and pressure are applied to decompose the foaming agent. When the pressure is removed, the material is still in its softened state; then the gas produced by the decomposition of the blowing agent is allowed to expand thereby producing a foamed thermoplastic pipe.

In the foregoing discussion, pipes or tubing were described for purposes of illustration. It is evident that other essentially hollow articles can be produced by similar methods, for example, pressure vessels, drums, containers, spheres, cylinders, etc. In more complicated shaping operations, it may be desirable for the mandrel or core to become an integral part of the finished pbject.

The following examples further illustrate the invention.

EXAMPLE 1

A pipe-forming apparatus similar to that of FIG. 1 was used to produce pipe sections. The polished steel mandrel was circular and of diameter 4 inches. The mandrel possessed a 1° taper to facilitate pipe removal. Four identical external mating sections (without a taper) were used to shape the pipe to a wall thickness of approximately 0.100 inch. The length of the mandrel used was 3 feet. Each of the external sections was attached to a hydraulic ram capable of delivering a force of about 20 tons. The forming pressure was thus limited to a maximum of roughly 400 psi on each of the four sections. The sections and mandrel were bored for oil heating (up to 200°C.) and water cooling.

A mixture of polypropylene and continuous glass mat was molded in a hydraulic laminating press to yield a thermoplastic polymer composite sheet containing 30 percent glass mat. The sheet measured 13 × 36 × 0.1 inches. The sheet was preheated in an infrared oven to above the softening point of the polymer. The heated sheet was then taken out of the oven, and draped over the mandrel, which was then kept at 30°C. The 4 external sections, also at 30°C., were then closed to maximum pressure simultaneously for a period of 12 seconds. After this time, the polymer tube was rigid enough to be removed from the tapered mandrel by slight knocking at the larger end of the mandrel. A perfectly round tube of internal diameter 4 inches and of length 36 inches was obtained.

EXAMPLE 2

A polymeric charge of a 30 percent glass fiber reinforced nylon 6 composition was extruded from a 1½ inch extruder, in the form of a "rope" or "log" approximately five-eighths inch in diameter and 36 inches long directly between a mechanically expandable mandrel and a mated mold section. The mandrel was expanded and after setting of the charge the mandrel was contracted and the formed pipe easily removed.

EXAMPLE 3

The procedure of Example 1 was repeated using a composite sheet of polyethylene and glass, except that prior to forming of the tubular pipe the pre-heated thermoplastic sheet was placed upon an aluminum foil sheet. During forming of the pipe, the aluminum foil became an integral part of the internal surface of the pipe. All other operating conditions were identical to those of Example 1.

EXAMPLE 4

The procedure of Example 1 was repeated, except that a thermosetting material was used to form the 3 foot length of pipe. The thermosetting material was Vigrin-Mat L-1703, a low-shrinkage, glass fiber reinforced, particulate filled, polyester sheet molding compound produced by Marco Chemical Division of W. R. Grace & Co., Linden, N.J.

The dry, reactive thermosetting sheet was placed over the mandrel as in Example 1, with the exception that both the mandrel and the external mating parts were heated to 150°C. The system was "closed," and maintained under 300 psi of pressure for 2 minutes. After this time, the sheet was totally cured and easily removed from the mandrel by use of a knock-off ring.

EXAMPLE 5

The procedure of Example 4 was repeated, except that the thermosetting polymer charge was a polyglycidal ester of adipic acid and was in bulk instead of sheet form. Specifically, the charge was a "rope" of glass fiber reinforced thermosetting polyester. After simultaneous closing of the 4 external mating mold sections, all curing and operating conditions were identical to those described in Example 4.

EXAMPLE 6

The procedure of Example 1 was repeated, with the following exception: A tubular object 36 inches long having a square cross-section was produced. The apparatus similar to that described in FIG. 4 was used, with each face of the square mandrel being approximately 3 inches in length.

Pre-heated polyvinyl chloride was draped across the square mandrel, and the two external mold sections were used.

After a 10 second dwell time, the square hollow "pipe" was removed from the mandrel.

EXAMPLE 7

An I-beam was prepared using a fiber reinforced polyurethane prepared according to the method of U.S. Pat. No. 3,464,935. The preheated polyurethane sheet was draped over a wooden I-shaped mandrel and processed as in Example 1. After setting, the mandrel was not removed thus becoming an integral part of the interior of the final structure.

EXAMPLE 8

The procedure of Example 1 was repeated with the following exception: the glass fiber reinforcement was a continuous nonwoven scrim. Such a reinforcement processes the characteristic of having all of the glass fibers longitudinally aligned in one direction, with a very small amount of adhesive applied in a direction perpendicular to the fibers and serving to hold the multitude of fibers together.

This non-woven fabric was laminated with polyethylene into a composite sheet having a 20 percent of the total weight the fiber reinforcement. This composite sheet was heated and placed over the shaping mandrel, and formed into a round tube in which the fibrous reinforcement was placed annularly. This annular reinforcement construction is desirable for application which the tube may be subjected to large internal pressures.

It is obvious that various changes may be made in details without departing from the spirit of the invention. Accordingly, it will be understood that the invention is not to be limited to the specific details shown and described.

I claim:

1. A method of forming a continuous hollow object comprising the steps of:
   1. placing a first formable plastic charge of volume sufficient to yield a first section of the desired shape, said section having an expanded end and an opposite unexpanded end, between a relatively moving molding system comprising:
      a. an internal mandrel of a form corresponding to the inner shape of the desired article and
      b. external mated molding sections;
   2. closing the system and exerting sufficient pressure and heat to shape the charge around the mandrel;
   3. allowing sufficient time to permit the charge to solidify;
   4. removing the first section from the mandrel;
   5. placing a second formable plastic charge of volume sufficient to yield a second section of the desired shape, said second section having an unexpanded end and an opposite expanded end, between said relatively moving molding system;
   6. maintaining said unexpanded end of said first section in contact with the portion of said second formable plastic charge that forms said expanded end of said second section;
   7. closing the system and exerting sufficient pressure and heat to shape said second charge around the mandrel;
   8. allowing sufficient time to permit said second charge to solidify into a second section having its expanded end in contact with said unexpanded end of the first section;
   9. removing said second section from said mandrel; and
   10. repeating steps (1) through (9) to form a continuous hollow object.

2. The method of claim 1 in which the mandrel possesses a circular cross-section.

3. The method of claim 1 in which the mandrel possesses an I-shaped cross-section.

4. The method of claim 1 in which the external mating sections are moveable.

5. The method of claim 1 in which the charge is in the form of a sheet.

6. The method of claim 1 in which the plastic material is reinforced.

7. The method of claim 1 in which the plastic material is filled.

8. The method of claim 1 in which the thermoplastic is polyethylene.

9. The method of claim 1 in which the thermoplastic is polypropylene.

10. The method of claim 1 in which the thermoplastic is nylon 6.

11. The method of claim 1 in which the thermoplastic is polyvinyl chloride.

12. The method of claim 1 in which the thermosetting polymer is a cross-linked polyester.

13. The method of claim 1 in which the thermosetting polymer is a curable polyurethane.

14. The method of claim 1 in which the thermosetting polymer contains an epoxy group.

* * * * *